United States Patent [19]
Obadia

[11] Patent Number: 5,756,178
[45] Date of Patent: May 26, 1998

[54] SCREW CAPS AND SEALS FOR SCREW CAPS

[75] Inventor: Jacques Obadia, Paris, France

[73] Assignee: Rical, S.A., Longvic Cedex, France

[21] Appl. No.: 231,697

[22] Filed: Apr. 25, 1994

[30] Foreign Application Priority Data

May 5, 1993 [FR] France ................... 93 05374

[51] Int. Cl.⁶ ............... B32B 7/02; B32B 25/08; B32B 27/08; B32B 27/32
[52] U.S. Cl. ............... 428/66.4; 428/212; 428/215; 428/337; 428/339; 428/476.9; 428/483; 428/518; 428/520; 428/523; 215/341; 215/347
[58] Field of Search ............... 428/35.4, 36.6, 428/36.7, 522, 518, 515, 516, 523, 520, 69.1, 66.4, 212, 213, 215, 332, 337, 339, 476.3, 476.9, 480, 483; 215/341, 347, 349, 350, 351, 352, 217, 218, 219, 220, 233, 234, 271, 270, 273, 292

[56] References Cited

U.S. PATENT DOCUMENTS

| | | | |
|---|---|---|---|
| 4,361,457 | 11/1982 | Keeler et al. | 156/224 |
| 4,640,428 | 2/1987 | Chang | 215/270 |
| 4,684,554 | 8/1987 | Ou-Yang | 428/35 |
| 4,723,678 | 2/1988 | Kollen et al. | 215/347 |
| 4,789,074 | 12/1988 | Han | 215/347 |
| 4,846,362 | 7/1989 | Schloss | 215/349 |
| 4,935,273 | 6/1990 | Ou-Yang | 428/35.7 |
| 5,045,369 | 9/1991 | Kobayashi et al. | 428/36.7 |
| 5,045,594 | 9/1991 | Samuel et al. | 525/57 |
| 5,160,687 | 11/1992 | Margaria | 264/271.1 |

FOREIGN PATENT DOCUMENTS

| | | |
|---|---|---|
| 0 288 972 | 11/1988 | European Pat. Off. . |
| 0 306 820 | 3/1989 | European Pat. Off. . |
| 0 530 977 | 3/1993 | European Pat. Off. . |
| 66 379 | 5/1973 | Luxembourg . |
| 1 347 883 | 2/1974 | United Kingdom . |

*Primary Examiner*—Paul J. Thibodeau
*Assistant Examiner*—Vivian Chen
*Attorney, Agent, or Firm*—Beveridge, DeGrandi, Weilacher & Young, L.L.P.

[57] ABSTRACT

Composite material for seals of plastic caps, especially of screw caps, ensuring leakproofing against liquids and imperviousness to gases at the same time, characterized in that it comprises, combined in a coherent multilayer structure, at least one middle layer (4) made of a plastic substance with a gas barrier effect, with a high modulus of rigidity, two outer layers (7) arranged on either side of the middle layer and consisting of a plastic substance with a low modulus of rigidity, each of the outer layers having a thickness greater than the thickness of the middle layer, and between the middle layer (4) and each outer layer (7) an intermediate layer (5) made of a substance of the same class as the outer layer, but with a high modulus of rigidity.

26 Claims, 2 Drawing Sheets

5,756,178

SCREW CAPS AND SEALS FOR SCREW CAPS

The present invention relates to a composite material for seals, especially for screw caps, and to a seal produced from such a material, ensuring leakproofing against liquids and imperviousness to gases at the same time.

The substances generally employed for the production of leakproofing seals for closure caps for bottles are flexible substances which are relatively permeable to gases such as oxygen, carbon dioxide and nitrogen. Similarly, thermoplastic substances which are generally employed for injection moulding of closure caps employing such seals are relatively permeable to gases. As a result, the lifetime of the products packaged in bottles, flasks or other receptacles closed with such caps is reduced because of the gas exchanges through the caps.

These gas exchanges may, for example, result in an entry of oxygen inside the receptacles, resulting in impairment of the organoleptic properties of sensitive products such as fatty substances of unsaturated type. They can also result in a loss of flavour in aromatic substances. Finally, these gas exchanges can result in undesirable external odours, related, for example, to the storage environment of the products being trapped by the product contained in the receptacle.

All these factors of deterioration of the organoleptic properties of the packaged products argue in favour of an improvement in the materials for use as seals for caps, especially plastic screw caps.

The diverse composite materials employed hitherto to try and combine, on the one hand, substances which have good barrier properties to gases and other volatile substances and, on the other hand, substances with a low modulus of rigidity, which are therefore flexible and compressible, possessing good leakproofing performance against liquids and an ability to compensate the irregularities and tolerances of the necks of the receptacles, are not entirely satisfactory.

The present invention consequently relates to a composite material for seals especially for screw caps, a material which, while being simple to manufacture and low in cost, meets the two contradictory requirements of leakproofing against liquids and imperviousness to gases. The invention further relates to a seal for caps, produced in a simple manner from such a material.

The composite material forming the subject of the present invention for seals especially for screw caps, ensuring leakproofing against liquids and imperviousness to gases at the same time, comprises, combined in a coherent multilayer structure, at least one middle layer made of a plastic substance with a gas barrier effect, with a high modulus of rigidity, (modulus of elasticity) and two outer layers arranged on either side of this middle layer and consisting of a plastic substance with a low modulus of rigidity, each of the two outer layers having a thickness greater than the thickness of the middle layer.

Preferably, the material may additionally comprise, between the middle layer and the outer layer, an intermediate layer of a substance of the same polymer type as the outer layer, but which has a high modulus of rigidity.

The intermediate layers are advantageously joined to the middle layer by adhesive bonding and the outer layers are joined to the intermediate layers by calendering while heated.

The middle layer may, for example, consist of a sheet of PET, PA, PVDC or E/VAL with a thickness of between 100 and 250 µm.

Each outer layer may consist of a sheet of PP with a thickness of between 300 and 550 µm.

Each intermediate layer may consist of a film of PP with a thickness of between 10 and 50 µm.

The substance of the middle layer and the substance of the intermediate layers may advantageously have a modulus of rigidity in the same region, preferably a modulus of regidity of between 1300 and 2200 MPa.

The substance of the outer layers, for its part, may have a modulus of rigidity of between approximately 100 and 300 MPa.

The intermediate layers are preferably joined to the middle layer by adhesive bonding with the aid of polyurethane adhesive.

The seal forming the subject of the invention for a plastic cap, especially a screw cap for closing receptacles, is produced by cutting a disc from a composite material as defined above.

A more detailed description of an illustrative embodiment, which does not limit the invention, will be given below, reference being made to the attached diagrammatic drawings; in the drawings.

Figure 1:
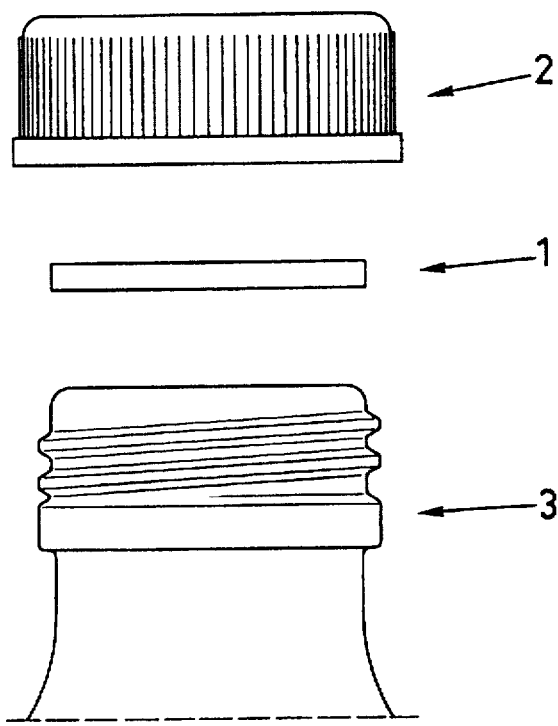
FIG. 1 shows a seal in accordance with the invention for a screw cap for closing a flask.
Figure 2:
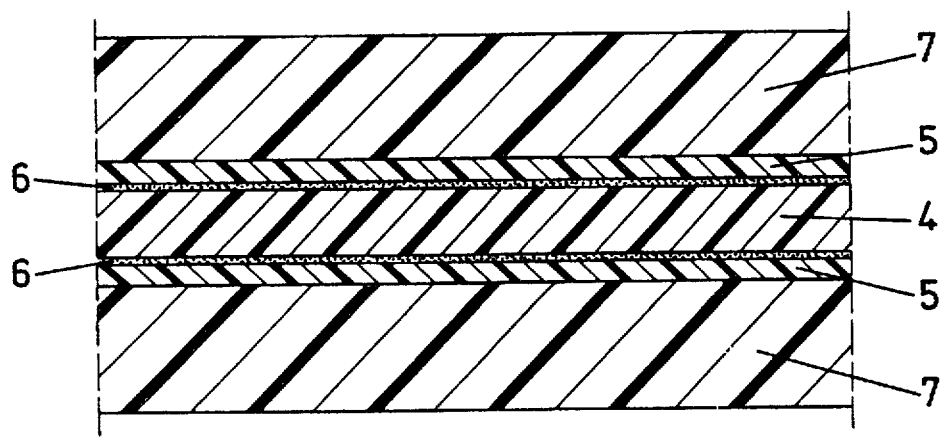
FIG. 2 is a greatly enlarged section of a composite material in accordance with the invention, for seals.
Figure 3:
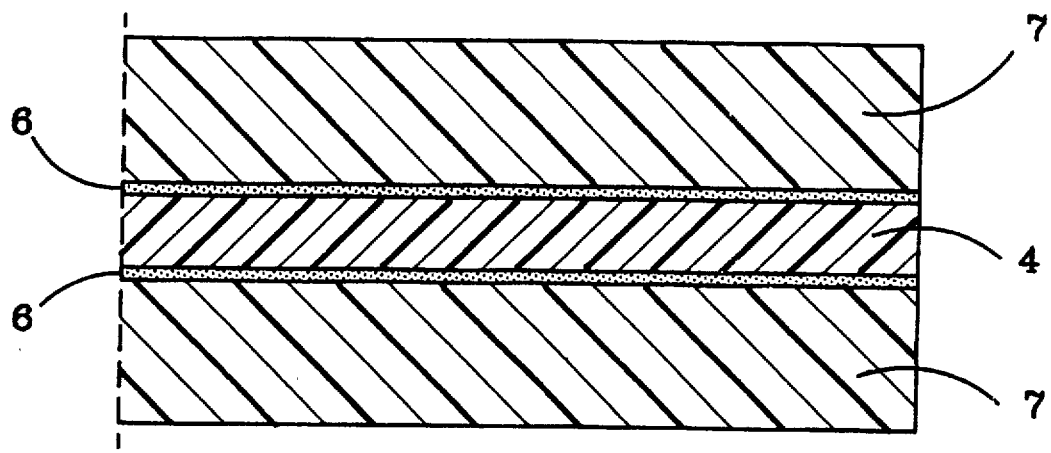
FIG. 3 is a section similar to FIG. 2, showing an alternative form of the invention; and, FIG. 4 is a view, partially in section, of a receptacle provided with a cap and a seal according to the invention.
Figure 4:
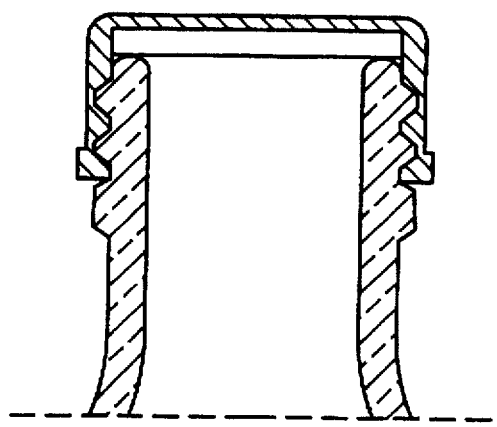

In FIG. 2, a seal 1 can be recognized, produced by cutting a disc from a composite material and added into a screw cap 2 for closing off the neck of a flask 3. The seal 1 is made of a composite material performing the two functions of imperviousness to gases and leakproofing against liquids, so that the cap 2 can be manufactured, for example, by injection moulding starting with a plastic substance, for example polypropylene, which may be chosen without taking account of special requirements concerning the imperviousness to gases and leakproofing against liquids.

The sealing material, as illustrated in FIG. 2, is made up of a middle layer 4, of two intermediate layers 5 joined to the two faces of the middle layer 4 by two layers of adhesive 6, and of two outer layers 7 joined respectively to the intermediate layers 5.

The middle layer 4 consists of a sheet with a thickness of between 100 and 250 µm made of a plastic substance with a gas barrier effect, for example PET (poly(ethylene terephthalate)), PA (polyamide), PVDC (poly(vinylidene chloride)) or E/VAL (ethylene/vinyl alcohol), which has a modulus of rigidity of the order of 1300 to 2200 MPa.

The intermediate layers 5 joined to the middle layer 4 by layers 6 of polyurethane adhesive may consist of PP films (made of polypropylene) with a thickness of 10 to 50 µm, with a high modulus of rigidity (between 1300 and 2200 MPa).

Each of the outer layers 7 may consist of a flexible sheet, with a thickness of between 300 and 550 µm, made of polypropylene elastomer with a low modulus of rigidity (100 and 300 MPa), the two outer layers 7 being assembled with heating, by calendering while heated, with the multilayer composite comprising the inner layer 4 and the two intermediate layers 5 joined to the inner layer 4 by the two layers of adhesive 6. Each of the outer layers 7 has an outer surface which is exposed, so both of these outer surfaces are capable of contacting and sealing against the end of the neck of a receptacle 3.

The different layers 4, 5, 7 of the composite material for seals thus being a laminate which has a perfectly coherent structure, despite the combination of a rigid substance with a gas barrier effect and of a flexible substance with an effect of leakproofing against liquids, this total cohesion enabling the material in accordance with the invention to stop, at the seal produced from this material, the gas exchanges both from the packaged product towards the surrounding environment and from the surrounding environment towards the packaged product.

Quite obviously, the embodiment shown and described has been given merely by way of an illustrative example without any limitation being implied, and many modifications and alternative forms are possible within the scope of the invention.

Thus, the single middle layer 4 could be replaced, for example, with a number of layers joined to each other, possibly made of different materials.

The intermediate layers 5 are intended to simplify the bonding of the outer layers 7 to the middle layer 1, a bonding which can be performed by calendering the outer layers 4 onto the inner layer 1, with heating, by virtue of the latter being lined with the two intermediate layers 2 consisting of a substance of the same polymer type as the outer layers 4. In an alternative form it would be possible to eliminate the intermediate layers and to join the outer layers to the middle layer directly by adhesive bonding.

Furthermore, substances other than those indicated above by way of example could be employed for the different layers, provided that, in one case, they exhibit the properties of imperviousness to gases and, in the other, the properties of leakproofing against liquids, the result being that these two apparently contradictory properties are combined in the composite material incorporating these different substances and the seal produced from this material.

I claim:

1. Seal member for plastic closure screw caps, providing liquid sealing and gas imperviousness consisting essentially of a laminate disc of symmetrical multilayer structure comprising a middle layer having a thickness of between 100 and 250 μm and made from a plastic material having a modulus of rigidity of between about 1300 and 2200 MPa and exhibiting a gas barrier effect, and two outer layers arranged on either side of said middle layer and each having a same thickness of between 300 and 550 μm and made from a plastic material exhibiting a modulus of rigidity of between about 100 and 300 MPa, each of said outer layers having an outer surface which is exposed so that both of said outer surfaces are capable of contacting and sealing against a neck of a receptacle.

2. Seal member according to claim 1, wherein said middle layer consists of a sheet selected from the group consisting of polyethylene terephthalate, polyamide, polyvinylidene chloride and ethylene/vinyl alcohol.

3. Seal member according to claim 1, wherein each of said outer layers consists of a sheet of polypropylene elastomer.

4. A plastic closure screw cap which includes a seal member according to claim 1.

5. A receptacle which is sealed by a plastic closure screw cap, said screw cap including a seal member according to claim 1, said receptacle having a neck which is directly contacted by one of said outer layers of said seal member.

6. Seal member according to claim 1, wherein said multilayer structure further comprises, between said middle layer and each of said outer layers, an intermediate layer having a thickness of between 10 and 50 μm and made of a plastic material of the same polymer as the outer layers, but exhibiting a modulus of rigidity of between about 1300 and 2200 MPa, each of said intermediate layers being joined to said outer layer by calendaring while heated.

7. Seal member according to claim 6, wherein each of said intermediate layers consists of a film of polypropylene.

8. Seal member according to claim 6, wherein each of said intermediate layers is joined to said middle layer with a polyurethane adhesive.

9. Seal member for plastic closure screw caps, providing liquid sealing and gas imperviousness consisting essentially of a laminate disc of symmetrical, multilayer structure comprising:

a middle layer made from a plastic material having a modulus of rigidity of between about 1300 and 2200 MPa and exhibiting a gas barrier effect;

two outer layers arranged on either side of said middle layer and being made from a plastic material exhibiting a modulus of rigidity of between about 100 and 300 MPa, and between said middle layer and each of said outer layers, an intermediate layer made of a plastic material of the same polymer as the outer layers, but exhibiting a modulus of rigidity of between about 1300 and 2200 MPa, the said two outer layers each having a same thickness of between 300 and 550 μm, said middle layer having a thickness of between 100 and 250 μm; said intermediate layers each having a same thickness of between 10 and 50 μm and being joined to said outer layers by calendaring while heated, and joined to said middle layer with a polyurethane adhesive;

each of said outer layers having an outer surface which is exposed so that both of said outer surfaces are capable of contacting and sealing against a neck of a receptacle.

10. Seal member according to claim 9, wherein each of said outer layers consists of a sheet of polypropylene elastomer.

11. A plastic closure screw cap which includes a seal member according to claim 9.

12. A receptacle which is sealed by a plastic closure screw cap, said screw cap including a seal member according to claim 9, said receptacle having a neck which is directly contacted by one of said outer layers of said seal member.

13. Seal member according to claim 9, wherein said middle layer consists of a sheet selected from the group consisting of polyethylene terephthalate polyamide, polyvinylidene chloride and ethylene/vinyl alcohol.

14. Seal member according to claim 13, wherein each of said intermediate layers consists of a film of polypropylene.

15. A plastic closure screw cap which includes a seal member which provides liquid sealing and gas imperviousness, said seal member consisting essentially of a laminate disc of symmetrical multilayer structure comprising a middle layer having a thickness of between 100 and 250 μm and made from a plastic material having a modulus of rigidity of between about 1300 and 2200 MPa and exhibiting a gas barrier effect, and two outer layers arranged on either side of said middle layer and each having a same thickness of between 300 and 550 μm and made from a plastic material exhibiting a modulus of rigidity of between about 100 and 300 MPa, each of said outer layers having an outer surface which is exposed so that both of said outer surfaces are capable of contacting and sealing against a neck of a receptacle.

16. A screw cap according to claim 15, wherein said middle layer consists of a sheet selected from the group consisting of polyethylene terephthalate, polyamide, polyvinylidene chloride and ethylene/vinyl alcohol.

17. A screw cap according to claim 15, wherein each of said outer layers consists of a sheet of polypropylene elastomer.

18. A receptacle which is sealed by a plastic closure screw cap according to claim 15, said receptacle having a neck which is directly contacted by one of said outer layers of said seal member.

19. A screw cap according to claim 15, wherein said multilayer structure further comprises, between said middle layer and each of said outer layers, an intermediate layer having a thickness of between 10 and 50 µm and made of a plastic material of the same polymer as the outer layers, but exhibiting a modulus of rigidity of between about 1300 and 2200 MPa, each of said intermediate layers being joined to said outer layer by calendaring while heated.

20. A screw cap according to claim 19, wherein each of said intermediate layers consists of a film of polypropylene.

21. A screw cap according to claim 19, wherein each of said intermediate layers is joined to said middle layer with a polyurethane adhesive.

22. A plastic closure screw cap which includes a seal member which provides liquid sealing and gas imperviousness, said seal member consisting essentially of a laminate disc of symmetrical, multilayer structure comprising:

a middle layer made from a plastic material having a modulus of rigidity of between about 1300 and 2200 MPa and exhibiting a gas barrier effect;

two outer layers arranged on either side of said middle layer and being made from a plastic material exhibiting a modulus of rigidity of between about 100 and 300 MPa, and between said middle layer and each of said outer layers, an intermediate layer made of a plastic material of the same polymer as the outer layers, but exhibiting a modulus of rigidity of between about 1300 and 2200 MPa, the said two outer layers each having a same thickness of between 300 and 550 µm, said middle layer having a thickness of between 100 and 250 µm; said intermediate layers each having a same thickness of between 10 and 50 µm and being joined to said outer layers by calendaring while heated, and joined to said middle layer with a polyurethane adhesive;

each of said outer layers having an outer surface which is exposed so that both of said outer surfaces are capable of contacting and sealing against a neck of a receptacle.

23. A screw cap according to claim 22, wherein each of said outer layers consists of a sheet of polypropylene elastomer.

24. A receptacle which is sealed by a plastic closure screw cap according to claim 22, said receptacle having a neck which is directly contacted by one of said outer layers of said seal member.

25. A screw cap according to claim 22, wherein said middle layer consists of a sheet selected from the group consisting of polyethylene terephthalate, polyamide, polyvinylidene chloride and ethylene/vinyl alcohol.

26. A screw cap according to claim 25, wherein each of said intermediate layers consists of a film of polypropylene.

* * * * *